(12) United States Patent
Roman

(10) Patent No.: US 6,204,649 B1
(45) Date of Patent: Mar. 20, 2001

(54) PWM REGULATOR WITH VARYING OPERATING FREQUENCY FOR REDUCED EMI

(75) Inventor: Jon R. Roman, Boynton Beach, FL (US)

(73) Assignee: Micrel Incorporated, San Jose, CA (US)

( * ) Notice: Subject to any disclaimer, the term of this patent is extended or adjusted under 35 U.S.C. 154(b) by 0 days.

(21) Appl. No.: 09/527,941

(22) Filed: Mar. 16, 2000

(51) Int. Cl.[7] ..................................................... G05F 1/40
(52) U.S. Cl. ........................................... 323/282; 323/285
(58) Field of Search ..................... 323/282, 284, 323/285, 351

(56) References Cited

U.S. PATENT DOCUMENTS

| | | | |
|---|---|---|---|
| 4,460,951 | * 7/1984 | Fenter et al. | 363/49 |
| 4,823,070 | 4/1989 | Nelson | 323/285 |
| 4,843,532 | 6/1989 | Freedman | 363/26 |
| 5,028,861 | 7/1991 | Pace et al. | 323/222 |
| 5,170,333 | 12/1992 | Niwayama | 363/21 |
| 5,235,504 | * 8/1993 | Sood | 363/53 |
| 5,479,090 | * 12/1995 | Schultz | 323/284 |
| 5,498,995 | * 3/1996 | Szepesi et al. | 327/538 |

OTHER PUBLICATIONS

Arbetter, et al, "DC–DC Converter Design for Battery–Operated Systems," 26th Annual IEEE Power Electronics Specialists Conference, vol. 1, 103–109. 1970 "no month".

Horowitz, et al, "The Art of Electronics", 2nd ed., Cambridge University Press, 1989, pp. 355–367.

Wang, et al., "Programmed pulsewidth modulator waveforms for Electromagnetic Interference," IEEE Trans. On Power Electronics, vol. 8, No. 4, Oct. 93, pp. 596–605.

Williams, "A Monolithic Switching Regulator with $100\mu V$ Output Noise," Linear Technology Application Note 70, Oct. 1997. 71 pages.

Code of Federal Regulations, Title 47, Part 15, Section 15.109 entitled "Radiated emission limits.", Oct., 1998 3 pages.

Micrel MIC2178 2.5A Synchronous Buck Regulator Data Sheet. Jun. 1998, pp. 1–16.

* cited by examiner

Primary Examiner—Adolf Deneke Berhane
(74) Attorney, Agent, or Firm—Skjerven Morrill MacPherson LLP; Carmen C. Cook

(57) ABSTRACT

A switching regulator for reducing electromagnetic interference (EMI) includes a PWM controller which incorporates a varying frequency oscillator for controlling the operating frequency of the switching regulator. The varying frequency oscillator provides an oscillating signal having a continuously varying frequency about the center switching frequency of the switching regulator. The varying frequency oscillating signal causes the operating frequency of the switching regulator to vary, spreading out the EMI noise generated by the switching regulator and effectively reducing the peak energy of the EMI noise.

33 Claims, 4 Drawing Sheets

PWM REGULATOR WITH VARYING OPERATING FREQUENCY FOR REDUCED EMI

BACKGROUND OF THE INVENTION

1. Field of the Invention

The invention generally relates to pulse-width modulated (PWM) power supplies; and in particular, the present invention relates to PWM power supplies with reduced electromagnetic interference (EMI).

2. Background of the Invention

Pulse-width modulated (PWM) power supplies encompass a wide variety of switching regulators having a constant switching frequency with variable "on" times (pulse widths). Adjusting the pulse widths based on a feedback voltage is used to generate a regulated dc voltage.

Exemplary circuit schematics for switching regulators can be found in Horowitz and Hill, "The Art of Electronics", $2^{nd}$ ed., Cambridge University Press, 1989, pages 355–367, which is incorporated herein by reference in its entirety. Some other switching regulator topologies can be found in U.S. Pat. No. 4,842,532 to Freedman, U.S. Pat. No. 4,823,070 to Nelson, U.S. Pat. No. 5,170,333 to Niwayama, and U.S. Pat. No. 5,028,861 to Pace et al., which are incorporated herein by reference in their entireties.

In brief, conventional PWM regulators include a PWM controller, one or more switching transistors, and a filter for providing the regulated voltage output. An oscillator in the PWM controller controls the switching frequency of the switching transistors.

It is well known that the switching action of a conventional switching regulator generates a substantial amount of "noise," including conducted and radiated electromagnetic interference (EMI). Conducted EMI may be caused by output voltage or current ripple at the switching frequency. Radiated EMI is noise generated by the switching of the transistor(s) radiated into the environment at the switching frequency and its associated harmonics. Radiated EMI causes interference with radio transmissions in the vicinity of the regulator.

Because EMI noise generated by a switching regulator, either conducted or radiated, can interfere with the operation of nearby electronic equipment, design consideration of a switching regulator or its application must include careful management of spurious EMI emissions. Additionally, the Federal Communications Commission (FCC) imposes limits on the amount of conducted and radiated emission generated by electronic devices acting as unintentional radiators. (See, FCC regulations on Radio Frequency Devices, 47 C.F.R. §15.109.)

The substantial amount of spurious EMI emissions generated by conventional switching regulators sometimes limit their applications in electronic devices. Therefore, it is desirable to provide a method for reducing the EMI noise generated by switching regulators. It is further desirable to provide a switching regulator where unwanted EMI emissions are reduced to a level which meets the FCC regulations so that the switching regulator can be applied to a wide-range of electronic applications such as cellular telephones and hand-held instruments.

SUMMARY

A switching regulator is described having reduced electromagnetic interference (EMI). The regulator includes a PWM controller using a varying frequency oscillator for controlling the operating frequency of the switching regulator. The varying frequency oscillator provides an oscillating signal having a continuously varying frequency. The oscillating signal of the varying frequency oscillator varies about the center switching frequency of the switching regulator, causing the frequency components of the EMI noise to spread out, reducing the peak energy of the EMI emissions.

In accordance with the method and apparatus of the present invention, both the conducted and radiated EMI of the switching regulator are reduced.

In one embodiment of the present invention, the frequency of the varying frequency oscillator varies at a rate greater than about 20 kHz (above audio limits). The frequency of the oscillating signal varies within a frequency range of greater than ±10% of the center switching frequency. The oscillating signal can be one of a ramp signal, a sawtooth signal, a sine wave, or a square wave.

In one embodiment of the present invention, the varying frequency oscillator is implemented as a voltage controlled oscillator. The voltage controlled oscillator receives a voltage control input signal which is the sum of two voltage signals. The first voltage signal defines the center frequency of the voltage controlled oscillator. The second voltage signal defines the frequency variation rate and frequency variation range of the output signal of the voltage controlled oscillator.

In another embodiment, the varying frequency oscillator is implemented as a low frequency voltage controlled oscillator coupled to a waveform generator for generating an oscillating signal having a continously varying frequency.

The varying frequency oscillator may be external to a PWM controller integrated circuit (IC), such as connected to a sync pin or clock pin of the IC, or the oscillator may be formed on the PWM controller IC itself.

The present invention is better understood upon consideration of the detailed description below and the accompanying drawings.

BRIEF DESCRIPTION OF THE DRAWINGS

In the present disclosure, like objects which appear in more than one figure are provided with like reference numerals.

DETAILED DESCRIPTION OF THE PREFERRED EMBODIMENTS

According to the principles of the present invention, a method for reducing electromagnetic interference (EMI) of a PWM switching regulator is provided in which the operating frequency of the switching regulator is varied continuously about the center switching frequency of the switching regulator. By varying the operating frequency of the switching regulator, the frequency components of the EMI generated by the switching regulator are spread out into a wider RF spectrum and consequently, the peak amplitude of the harmonic energy of the EMI is reduced to an acceptable level.

One measure of an acceptable level of unwanted EMI emission is the FCC regulations which impose limits on the conducted and radiated emission levels from unintentional radiators. While the FCC regulations do not regulate the amount of overall spectral noise, the FCC regulations impose limits on the amplitude of the noise spectra. One advantage of a switching regulator according to the present invention is that a 10 dB or more reduction in the amplitude of the spectral noise can be attained, ensuring that the switching regulator can readily meet the FCC regulations. Another advantage of the switching regulator according to the present invention is that one can observe noticeable improvement in radio reception in the immediate vicinity of the switching regulator.

The method and apparatus of the present invention can be applied to any PWM power supply or switching regulator topologies for reducing EMI noise.

Figure 1:
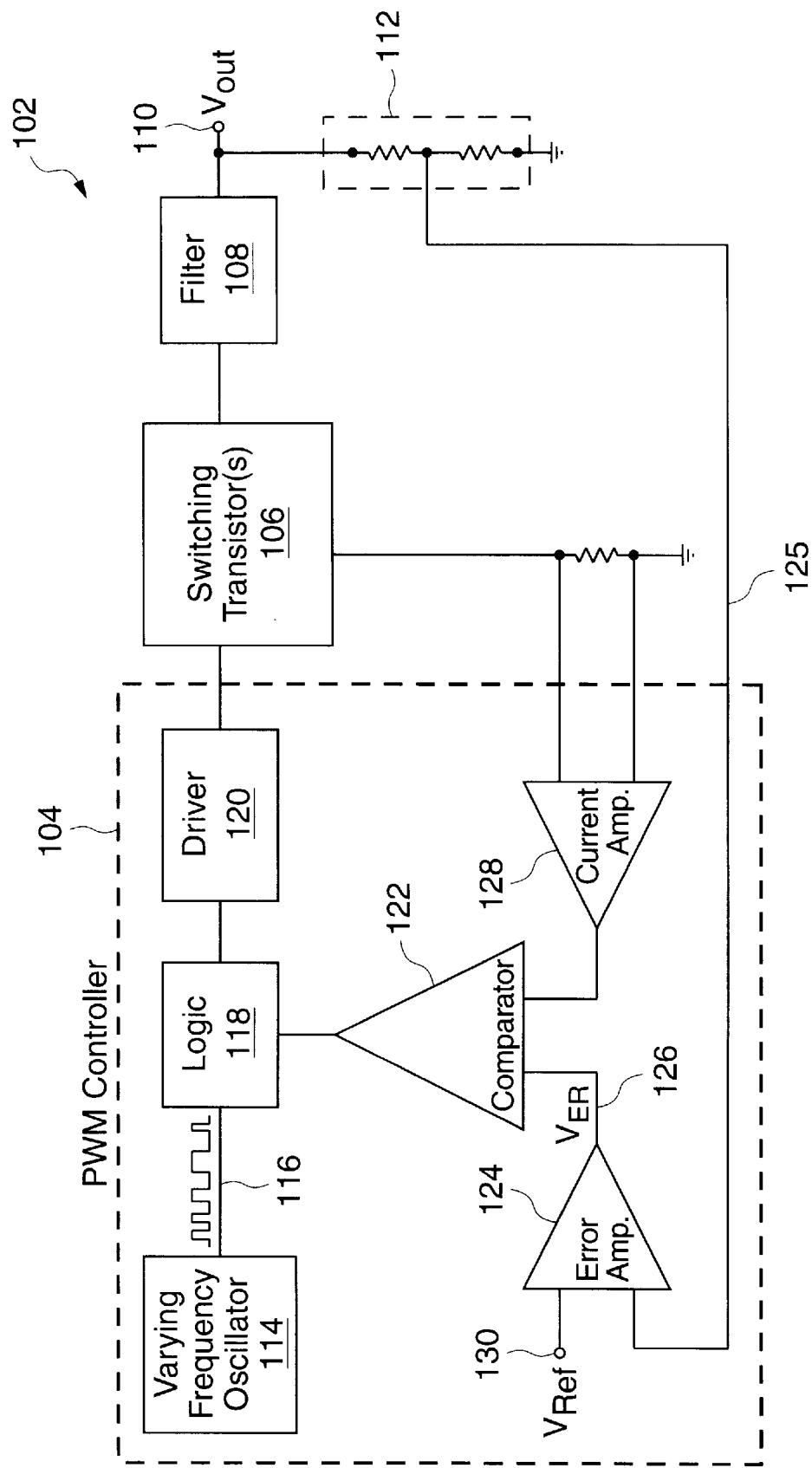
FIG. 1 is a diagram of a switching regulator including a varying frequency oscillator according to one embodiment of the present invention.
Figure 2:
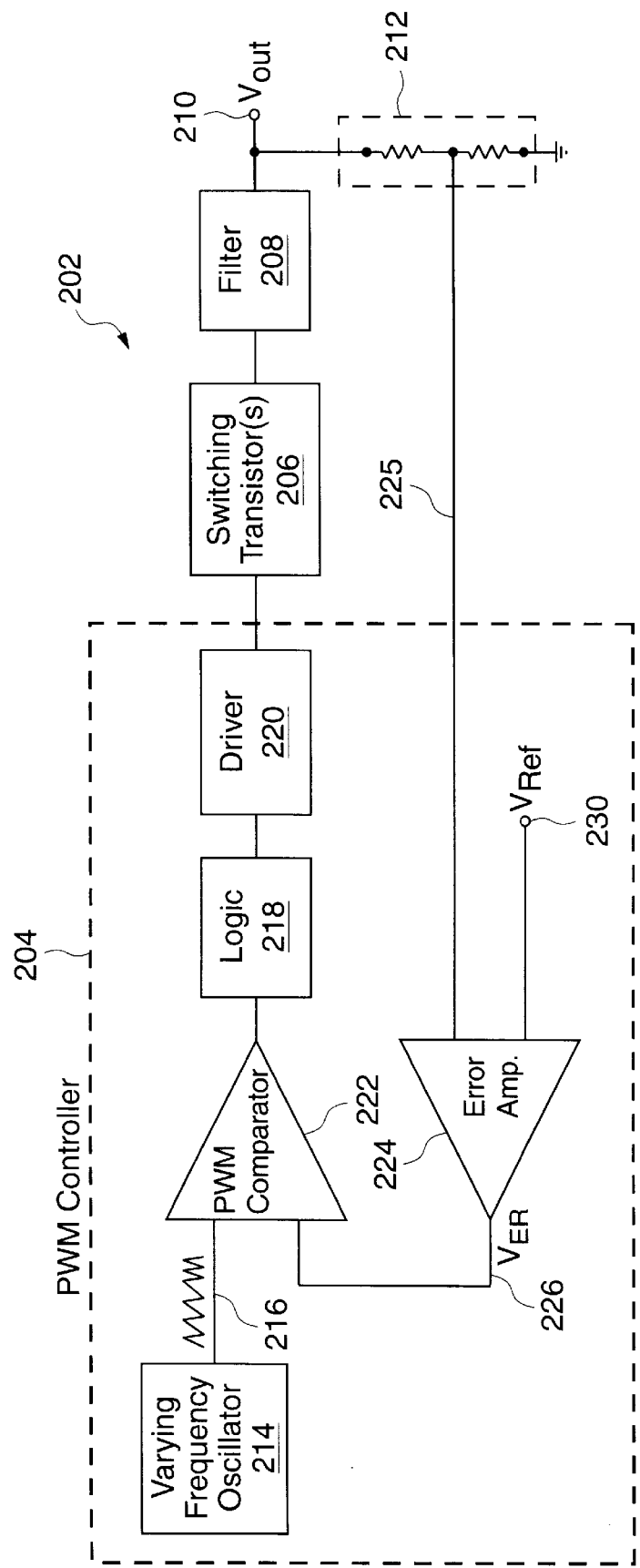
FIG. 2 is a diagram of a switching regulator including a varying frequency oscillator according to another embodiment of the present invention.

FIGS. 1 and 2 are two exemplary embodiments of the present invention illustrating a varying frequency oscillator being incorporated into two common switching regulator topologies. Specifically, FIG. 1 is a current mode regulator, and FIG. 2 is a voltage mode regulator. The two switching regulator topologies of FIGS. 1 and 2 are illustrative only and are not intended to limit the present invention to these two switching regulator topologies. One of ordinary skill in the art, upon being apprised of the method and apparatus of present invention, would know how to apply the present invention to other switching regulator topologies for reducing EMI noise.

Turning now to FIG. 1, switching regulator 102 includes a PWM controller 104, switching transistor(s) 106, and a filter 108. The regulated voltage output $V_{out}$ is provided at an output terminal 110 of filter 108. Switching transistor(s) 106 can be implemented as a single switching transistor (along with a freewheeling diode) or a pair of synchronously switched transistors. The precise configuration of switching transistor(s) 106 is not critical to the practice of the present invention. The output of switching transistor(s) 106 is coupled to filter 108, which is typically an LC network. Criteria for selecting the appropriate inductance and capacitance values are well-known in the art. The regulated output voltage $V_{out}$ at node 110 is also coupled to a resistor network 112 to provide a scaled version of voltage $V_{out}$ as a feedback signal to PWM controller 104 on lead 125. The output circuit topology may create a buck, boost, flyback, or other type of regulator.

PWM controller 104 includes a varying frequency oscillator 114 for controlling the operating frequency of switching regulator 102. Varying frequency oscillator 114 generates an oscillating signal on lead 116, where the oscillating signal has a continuously varying frequency. The phrase "continuously varying frequency," in this context, means that the switching frequency is not fixed for more than a few switching cycles. The variation of frequency may change smoothly or may change in multiple cycle per second increments.

PWM controller 104 further includes control circuitry for controlling the switching times of switching transistor(s) 106 and a driver circuit 120 for providing the proper drive voltage/current to switching transistor(s) 106.

In the switching regulator of FIG. 1, the control circuitry of PWM controller 104 includes a current sense amplifier 128 which measures the LC charging current through switching transistor(s) 106 and generates a corresponding output voltage signal. The output of current sense amplifier 128 is coupled to a comparator 122 to be compared with an error voltage signal $V_{ER}$ on lead 126. Error voltage signal $V_{ER}$ is generated by an error amplifier 124 which compares the scaled version of the regulated output voltage $V_{out}$ (fed back to error amplifier 124 on lead 125) and a reference voltage $V_{Ref}$ provided on node 130.

In operation, the output of comparator 122 is a signal indicating when the current through switching transistor(s) 106 reaches a level set by the error voltage $V_{ER}$. At that point, the charging switching transistor 106 is to be turned off to maintain the regulated output voltage. The output of comparator 122, together with the oscillating signal on lead 116, are coupled to a logic circuit 118, which provides a control signal for driver circuit 120 to control the duty cycle of switching transistor(s) 106.

In the present embodiment, varying frequency oscillator 114 generates an oscillating signal having a continuously varying frequency. In a preferred embodiment, the frequency range is a ±10% to ±30% deviation about the center switching frequency. The rate of the variation of the oscillating frequency is substantially lower than the switching frequency of switching regulator 102. Typically, the rate of variation is between 10% and 30% of the center switching frequency. In a preferred embodiment, when the center switching frequency is 200 kHz, the variation rate of the oscillating frequency is between 20 kHz to 50 kHz.

In one embodiment, the center switching frequency is 200 kHz, the frequency range is ±20 kHz about the center frequency, and the rate of change is at 20 kHz.

The varying frequency oscillating signal causes the operating frequency of switching regulator 102 to deviate about the center switching frequency. In this manner, the harmonic components of the EMI generated by switching regulator 102 are spread out, and the amplitudes of the harmonic peaks are reduced. Both the conducted EMI and radiated EMI are reduced in switching regulator 102.

For the switching regulator topology illustrated in FIG. 1, the oscillating signal generated by varying frequency oscillator 114 is a square wave signal. However, one of ordinary skill in the art would appreciate that the oscillating signal can be other waveforms for use with other switching regulator topologies.

Turning now to FIG. 2, which illustrates another embodiment of the present invention, where the varying frequency oscillator is applied to a voltage mode regulator 202. Switching regulator 202, like regulator 102, includes a PWM controller 204, switching transistor(s) 206, and a filter 208, typically an LC network. The regulated voltage output $V_{out}$ is provided at the output terminal 210 of filter 208. Switching transistor(s) 206 can be implemented as a single switching transistor (and diode) or a pair of complementary switching transistors. The regulated output voltage $V_{out}$ at node 210 is coupled to a resistor network 212 to provide a feedback voltage signal to PWM controller 204 on lead 225.

PWM controller 204 of switching regulator 202 includes a varying frequency oscillator 214 for generating an oscillating signal on lead 216 having a continuously varying frequency. PWM controller 204 further includes control circuitry, for controlling the switching times of switching regulator 202, and a driver circuit 220 for driving switching transistor(s) 206. In PWM controller 204, the control circuitry includes an error amplifier 224 for comparing a scaled version of the regulated output voltage $V_{out}$ and a reference voltage $V_{Ref}$ (node 230). Error amplifier 224 provides an error voltage signal $V_{ER}$ on lead 226. The error voltage signal $V_{ER}$ and the varying frequency oscillating signal (on lead 216) are coupled to a PWM comparator 222. PWM comparator 222 generates an output signal coupled to a logic circuit 218. Logic circuit 218 provides an output control signal for controlling the switching times of transistor(s) 206.

Similar to the operation of switching regulator 102, varying frequency oscillator 214 causes the operating frequency of switching regulator 202 to vary continuously about the center switching frequency of the switching regulator. As a result, both the conducted and the radiated EMI generated by the switching action of switching regulator 202 is reduced.

In FIG. 2, varying frequency oscillator 214 is illustrated as generating an oscillating signal having a ramp waveform. Other suitable signal waveforms, such as sine waves, can be used with this switching regulator topology.

Figure 3:
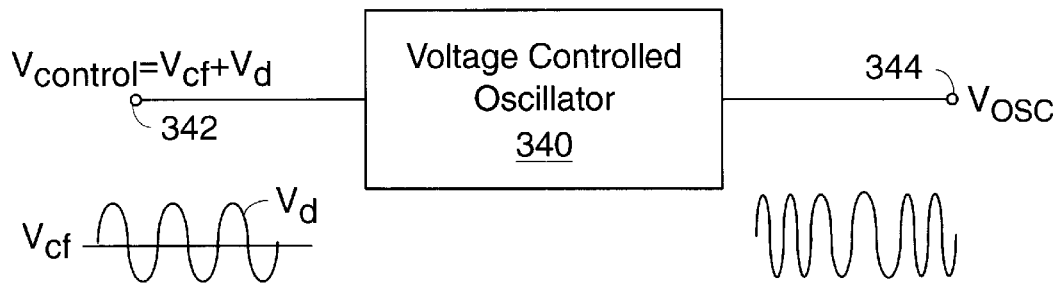
FIG. 3 is a diagram of one embodiment of a varying frequency oscillator according to the present invention.

FIG. 3 illustrates one embodiment of a varying frequency oscillator. In the present embodiment, the varying frequency oscillator is implemented as a voltage controlled oscillator 340. Voltage controlled oscillator 340 receives a voltage control input signal $V_{control}$ on an input terminal 342 and provides an oscillating signal $V_{osc}$ having a continuously varying frequency at an output terminal 344. The voltage control input signal $V_{control}$ is the sum of two voltage signals. The first voltage signal $V_{cf}$ controls the center frequency of voltage controlled oscillator 340.

The second voltage signal $V_d$ is an oscillating voltage signal having a frequency substantially lower than the switching frequency. Second voltage signal $V_d$ can be generated by a low frequency voltage controlled oscillator or by other means known to those of ordinary skill in the art. The second voltage signal may vary smoothly or vary in increments. In one embodiment, the frequency of second voltage signal $V_d$ is between 10% to 30% of the center frequency of voltage controlled oscillator 340. In operation, second voltage signal $V_d$, when superimposed on first voltage signal $V_{cf}$, causes the frequency of oscillating signal $V_{osc}$ to vary at a rate equal to the frequency of second voltage signal $V_d$. The amplitude of second voltage signal $V_d$ is selected to define the range of frequency deviation of oscillating signal $V_{osc}$. Preferably, the range of frequency deviation is approximately ±30% or less of the center switching frequency.

Figure 4:
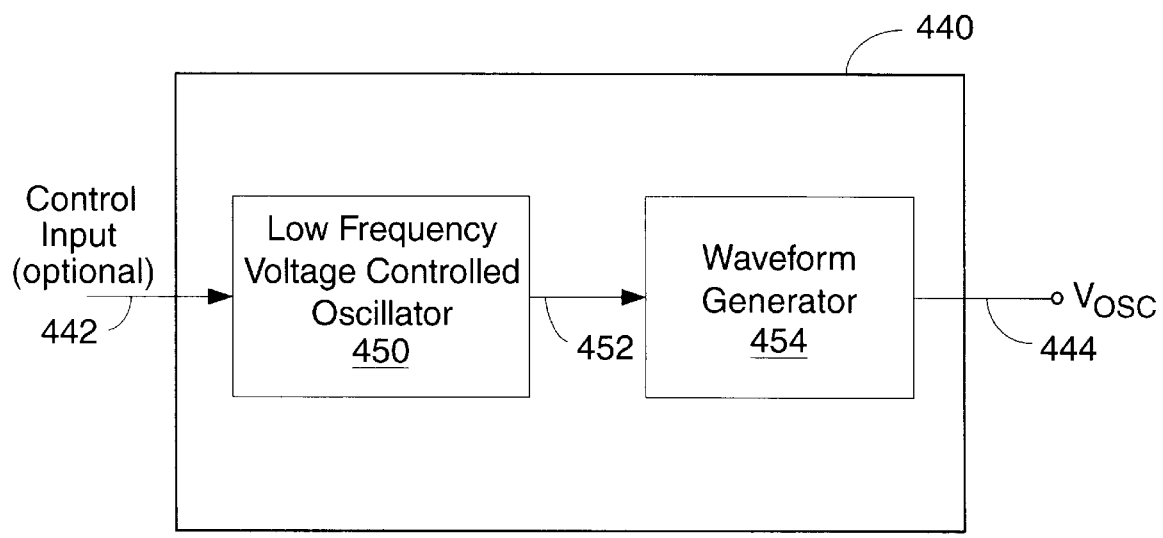
FIG. 4 is a diagram of another embodiment of a varying frequency oscillator according to the present invention.

FIG. 4 is yet another embodiment of a varying frequency oscillator according to the present invention. Varying frequency oscillator 440 includes a low frequency voltage controlled oscillator 450 and a waveform generator 454. Low frequency oscillator 450 provides a first oscillating signal on lead 452. The frequency of the first oscillating signal on lead 452 is substantially lower than the switching frequency of the regulator. Low frequency voltage controlled oscillator 450 may further include an optional control input terminal for receiving a control voltage used to select the frequency of the first oscillating signal.

Waveform generator 454 is programmed to generate a desired waveform operating at the center switching frequency of the regulator. The waveform generated by waveform generator 454 can be a ramp signal, a sawtooth signal, a sine wave, or a square wave. The first oscillating signal of low frequency voltage controlled oscillator 450 controls waveform generator 454 such that the output oscillating signal $V_{osc}$ at node 444 has a continuously varying frequency about the switching frequency.

In one embodiment, both low frequency voltage controlled oscillator 450 and waveform generator 454 can be implemented using a well known 555 IC timer.

In one embodiment of the present invention, the varying frequency oscillator can be implemented with the PWM controller as a single integrated circuit. Alternately, the varying frequency oscillator can be implemented as a separate component apart from the PWM controller. The "off-chip" implementation scheme is useful for applying the method and apparatus of the present invention to commercially available, pre-fabricated PWM controller ICs.

Figure 5:
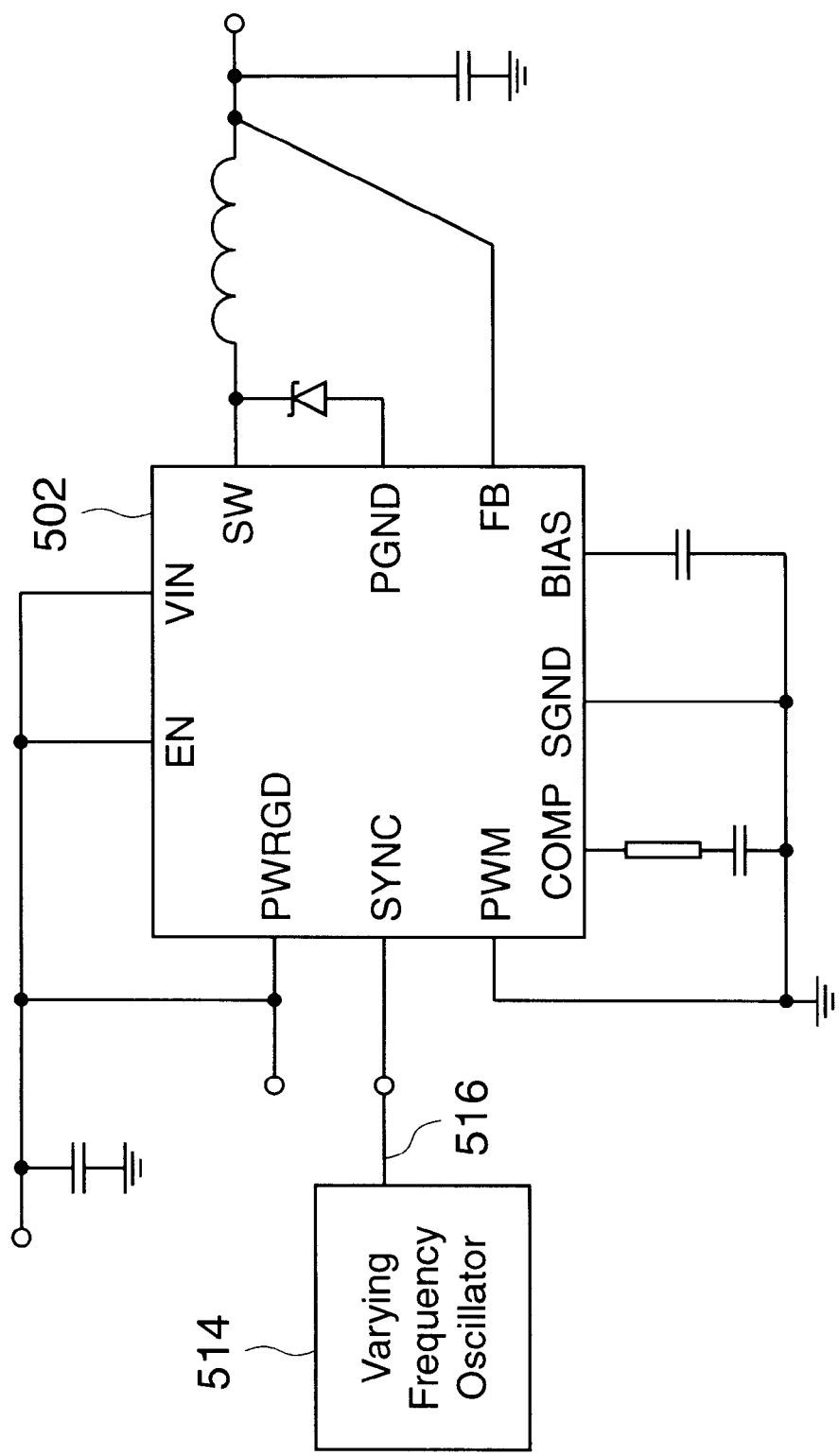
FIG. 5 is a diagram of a Micrel MIC2178 Buck Regulator coupled to a varying frequency oscillator according to one embodiment of the present invention.

In accordance with another embodiment of the present invention, the varying frequency oscillator can be coupled to a sync input pin of a PWM controller chip to provide a synchronization signal to an on-chip oscillator. This is shown in FIG. 5. The oscillating signal of the on-chip oscillator, upon being synchronized to the varying frequency oscillating signal, causes the regulator to have a continuously varying switching frequency.

In FIG. 5, a Micrel MIC2178 Buck Regulator 502 is shown coupled to a varying frequency oscillator 514. The Micrel MIC2178 regulator is available from Micrel, Inc., San Jose, Calif. A detailed description of the MIC2178 regulator can be found on Micrel's website at www.micrel.com. The data sheet for this product is incorporated herein by reference. The MIC2178 regulator includes an on-chip oscillator preset to 200 kHz but which can be synchronized to an external clock signal of up to 300 kHz. In the "off-chip" implementation scheme, varying frequency oscillator 514 is coupled to the SYNC pin of the MIC2178. The on-chip oscillator of the MIC2178 regulator 502 is synchronized to the varying frequency oscillating signal of oscillator 514, causing the operating frequency of regulator 502 to vary continuously for reducing EMI noise.

Varying frequency oscillator 514 can be implemented as a voltage controlled oscillator according to the embodiment shown in FIG. 3, as a low frequency voltage controlled oscillator and waveform generated according to the embodiment shown in FIG. 4, or implemented using any other technique. The oscillating signal of varying frequency oscillator 514 has a rate of frequency variation and a range of frequency deviation similar to that described above.

The "off-chip" implementation is also appropriate when the PWM switching regulator IC does not include an on-chip oscillator. In that case, the varying frequency oscillator will be coupled to the external clock pin of the regulator circuit.

The above detailed descriptions are provided to illustrate specific embodiments of the present invention and are not intended to be limiting. Numerous modifications and variations within the scope of the present invention are possible. The present invention is defined by the appended claims.

I claim:

1. A switching regulator for reducing electromagnetic interference (EMI) comprising:
    a PWM controller, said controller comprising:
        a varying frequency oscillator for controlling a switching frequency of at least one switching transistor coupled to said PWM controller, said oscillator providing an oscillating signal having a continuously varying frequency; and
        a control circuit for controlling a duty cycle of said at least one switching transistor, said control circuit coupled to receive said oscillating signal as a logic control signal from said varying frequency oscillator and generate a duty cycle control signal.

2. The switching regulator of claim 1 wherein said switching regulator further comprises said at least one switching transistor coupled to a filter for providing a regulated voltage output at an output terminal, and wherein said PWM controller is coupled to said at least one switching transistor for controlling an on-state and an off-state of said at least one switching transistor.

3. The switching regulator of claim 1 wherein said PWM controller further comprises:
   a driver circuit coupled to receive said duty cycle control signal from said control circuit and having an output connected to said at least one switching transistor.

4. The switching regulator of claim 3, wherein said control circuit comprises:
   a current sense amplifier for detecting a current through said at least one switching transistor and generating a current sense signal having a voltage indicative of the current through said at least one switching transistor;
   an error amplifier coupled to compare a regulated voltage to a reference voltage and generate a voltage error signal;
   a comparator coupled to compare said current sense signal to said voltage error signal and generate an output signal; and
   a logic circuit coupled to receive said oscillating signal from said varying frequency oscillator as said logic control signal and said output signal from said comparator, said logic circuit generating said duty cycle control signal provided to said driver circuit for controlling a duty cycle of said at least one switching transistor.

5. The switching regulator of claim 1 wherein the frequency of said oscillating signal of said varying frequency oscillator varies at a rate substantially lower than a center switching frequency of said at least one switching transistor.

6. The switching regulator of claim 5 wherein the frequency of said oscillating signal of said varying frequency oscillator varies at a rate between 10% and 30% of said center switching frequency of said at least one switching transistor.

7. The switching regulator of claim 5 wherein the frequency of said oscillating signal varies within a frequency range approximately ±10% to ±30% of said center switching frequency of said at least one switching transistor.

8. The switching regulator of claim 1 wherein the frequency of said oscillating signal varies within a frequency range approximately ±10% to ±30% of said center switching frequency of said at least one switching transistor.

9. The switching regulator of claim 1 wherein said oscillating signal is one of a sine wave signal or a square wave signal.

10. The switching regulator of claim 1, wherein said varying frequency oscillator is constructed on an integrated circuit separate from an integrated circuit on which said PWM controller is constructed.

11. The switching regulator of claim 1 wherein said logic control signal is a reset pulse.

12. A switching regulator for reducing electromagnetic interference (EMI), comprising:
   a PWM controller, said controller comprising:
      a varying frequency oscillator for controlling a switching frequency of at least one switching transistor coupled to said PWM controller, said oscillator providing an oscillating signal having a continuously varying frequency, said varying frequency oscillator comprising:
         a voltage controlled oscillator receiving a voltage control input signal and generating said oscillating signal having said continuously varying frequency;
      wherein said voltage control input signal is the sum of a first voltage signal and a second voltage signal; said first voltage signal being selected to operate said voltage controlled oscillator at a center switching frequency of said at least one switching transistor; said second voltage signal being an oscillating voltage signal having a second frequency substantially lower than said center switching frequency, the amplitude of said second voltage signal being selected to define a frequency range within which said oscillating signal varies continuously about said center switching frequency.

13. The switching regulator of claim 12 wherein said second frequency is between approximately 10% to 30% of said center switching frequency of said at least one switching transistor.

14. The switching regulator of claim 12 wherein said frequency range is between approximately ±10% and ±30% of said center switching frequency of said at least one switching transistor.

15. A switching regulator for reducing electromagnetic interference (EMI), comprising:
   a PWM controller, said controller comprising:
      a varying frequency oscillator for controlling a switching frequency of at least one switching transistor coupled to said PWM controller, said oscillator providing an oscillating signal having a continuously varying frequency, said varying frequency oscillator comprising:
         a low frequency voltage controlled oscillator for providing a first oscillating signal having a first frequency, said first frequency being substantially lower than a center switching frequency of said at least one switching transistor; and
         a waveform generator providing a second oscillating signal operating at said center switching frequency of said at least one switching transistor, said first oscillating signal controlling said waveform generator to generate at an output terminal said oscillating signal having said continuously varying frequency.

16. The switching regulator of claim 15, wherein said PWM controller further comprises:
   an error amplifier coupled to compare a regulated voltage to a reference voltage and generate a voltage error signal;
   a PWM comparator coupled to compare said voltage error signal with said oscillating signal of said varying frequency oscillator and generate an output signal; and
   a logic circuit coupled to receive said output signal of said PWM comparator and generate a control signal coupled to said driver circuit for controlling a duty cycle of said at least one switching transistor.

17. The switching regulator of claim 15 wherein said first frequency is between approximately 10% to 30% of said center switching frequency of said at least one switching transistor.

18. The switching regulator of claim 15 wherein the frequency of said oscillating signal varies within a frequency range approximately ±10% to ±30% of said center switching frequency of said at least one switching transistor.

19. The switching regulator of claim 15 wherein said waveform generator is configured to provided one of a sine wave signal or a square wave signal.

20. The switching regulator of claim 15 wherein said low frequency voltage controlled oscillator further comprises a control voltage input terminal for receiving a control voltage, said control voltage selecting said first frequency of said low frequency voltage controlled oscillator.

21. A switching regulator for reducing electromagnetic interference (EMI), comprising:
  a PWM controller, said controller comprising:
    a varying frequency oscillator for controlling a switching frequency of at least one switching transistor coupled to said PWM controller, said oscillator providing an oscillating signal having a continuously varying frequency; and
    a second oscillator;
    wherein said varying frequency oscillator is coupled to a synchronization input terminal of said second oscillator, said second oscillator being synchronized to said oscillating signal of said varying frequency oscillator and generate an oscillating signal having a continuously varying frequency for controlling said switching frequency of said at least one switching transistor.

22. The switching regulator of claim 21, wherein said varying frequency oscillator is separate from an integrated circuit on which said PWM controller, including said second oscillator, is constructed.

23. The switching regulator of claim 21, wherein the frequency of said oscillating signal of said varying frequency oscillator varies at a rate between 10% and 30% of a center switching frequency of said at least one switching transistor.

24. The switching regulator of claim 21 wherein the frequency of said oscillating signal varies within a frequency range approximately ±10% to ±30% of said center switching frequency of said at least one switching transistor.

25. The switching regulator of claim 21 wherein said varying frequency oscillator comprises:
  a voltage controlled oscillator receiving a voltage control input signal and generating said oscillating signal having said continuously varying frequency;
  wherein said voltage control input signal is the sum of a first voltage signal and a second voltage signal; said first voltage signal being selected to operate said voltage controlled oscillator at said center switching frequency of said at least one switching transistor; said second voltage signal being an oscillating voltage signal having a second frequency substantially lower than said center switching frequency, the amplitude of said second voltage signal being selected to define a frequency range within which said oscillating signal varies continuously about said center switching frequency.

26. The switching regulator of claim 21 wherein said varying frequency oscillator comprises:
  a low frequency voltage controlled oscillator for providing a first oscillating signal having a first frequency, said first frequency being substantially lower than said center switching frequency of said at least one switching transistor; and
  a waveform generator providing a second oscillating signal operating at said center switching frequency of said at least one switching transistor, said first oscillating signal controlling said waveform generator to generate at an output terminal said oscillating signal having said continuously varying frequency.

27. The switching regulator of claim 26 wherein said waveform generator is configured to provided one of a sine wave signal or a square wave signal.

28. The switching regulator of claim 26 wherein said low frequency voltage controlled oscillator further comprises a control voltage input terminal for receiving a control voltage, said control voltage selecting said first frequency of said low frequency voltage controlled oscillator.

29. A method for reducing electromagnetic interference (EMI) in a switching regulator, said regulator comprising a PWM controller coupled to a varying frequency oscillator, said method comprising:
  generating an oscillating signal having a continuously varying frequency;
  generating a duty cycle control signal using said oscillating signal as a logic control signal; and
  controlling a duty cycle of at least one switching transistor at said continuously varying frequency to output a regulated voltage.

30. The method of claim 29, wherein said oscillating signal includes one of a sine wave signal or a square wave signal.

31. The method of claim 29, wherein the frequency of said oscillating signal of said varying frequency oscillator varies at a rate substantially lower than a center switching frequency of said at least one switching transistor.

32. The method of claim 29 wherein the frequency of said oscillating signal of said varying frequency oscillator varies at a rate between 10% and 30% of a center switching frequency of said at least one switching transistor.

33. The method of claim 29 wherein the frequency of said oscillating signal varies within a frequency range approximately ±10% to ±30% of said center switching frequency of said at least one switching transistor.

* * * * *